United States Patent [19]

Carroll et al.

[11] 3,905,769

[45] Sept. 16, 1975

[54] METHOD AND APPARATUS FOR MEASURING PROTHROMBIN TIME AND THE LIKE

[75] Inventors: Wallace E. Carroll, Santa Barbara, Calif.; Richard D. Jackson, Lansdale, Pa.

[73] Assignees: Wallace E. Bagley; Wallace Industries Company, both of Philadelphia, Pa.; Alan A. Wilcox, Santa Barbara, Calif. ; part interest to each

[22] Filed: Feb. 28, 1974

[21] Appl. No.: 446,941

[52] U.S. Cl.............. 23/230 B; 23/253 R; 250/212; 356/39; 356/223
[51] Int. Cl.² G01J 1/42; G01N 21/24; G01N 33/16
[58] Field of Search......... 23/230 B, 253 R; 356/39, 356/223; 73/53, 64.1; 250/564, 565, 212

[56] References Cited
UNITED STATES PATENTS

| | | | |
|---|---|---|---|
| 2,326,878 | 8/1943 | Muller | 250/564 X |
| 2,363,473 | 11/1944 | Ryder | 250/564 X |
| 3,027,461 | 3/1962 | Kavanagh | 250/565 X |
| 3,440,866 | 4/1969 | Ness et al. | 356/39 X |
| 3,499,160 | 3/1970 | Gordon | 250/564 |
| 3,510,665 | 5/1970 | Goolsby | 250/565 |
| 3,518,013 | 6/1970 | Sanford et al. | 356/223 X |
| 3,518,438 | 6/1970 | Hart et al. | 250/212 X |
| 3,526,770 | 9/1970 | Dumpleton | 356/223 X |
| 3,574,553 | 4/1971 | Weitz et al. | 23/253 R |
| 3,817,632 | 6/1974 | Picunko et al. | 356/39 |

Primary Examiner—Robert M. Reese
Attorney, Agent, or Firm—Smith, Harding, Earley & Follmer

[57] ABSTRACT

In a blood coagulation determining apparatus, an electrical signal whose voltage is linearly related to the optical density of a semi-transparent sample is produced by using a generating photocell which generates an output approximately proportional to the sum of a constant and the logarithm of the transmittance of the sample. The voltage of the signal is subtracted electrically from a first variable represented by a selectable voltage. The result of the subtraction is then electrically multiplied by a second variable to produce an output for display and recording on a chart recorder. The apparatus is especially useful in blood clotting measurements wherein the visual or automatic recognition of straight lines in the plot of optical density versus time is important.

8 Claims, 2 Drawing Figures

METHOD AND APPARATUS FOR MEASURING PROTHROMBIN TIME AND THE LIKE

BACKGROUND OF THE INVENTION

This invention relates to the measurement of optical density (O.D.), and relates particularly to an apparatus for producing an electrical signal the voltage of which is linearly related to the optical density of a semi-transparent sample, and more particularly relates to method and apparatus for determining the coagulation rate or the like of fluids. Prior art apparatus are disclosed in U.S. Pat. Nos. 3,650,698; 3,635,678; 3,607,099; 3,593,568; and 3,587,295.

It is well known in the field of photometry that the concentration of a solute is proportional to the difference between a constant and the optical density of the solution, so that a photometric determination of concentration can be made by determining the degree to which the solution transmits monochromatic light and making an appropriate conversion of transmittance to optical density. Direct readings of optical density have been achieved by the use of meters with distorted scales or by linearizing circuitry, both of which are somewhat unsatisfactory, the former for lack of resolution, and the latter because of its complexity.

In some instances, it is necessary to produce a photometric output signal which is linearly related to optical density in order to facilitate the visual or automatic interpretation of the time-variations of optical density. Such interpretation comes about, for example, in the measurement of blood clotting, wherein the variations in optical density of a blood sample following the introduction of a reagent are interpreted in order to determine disease of the blood clotting system (Coagulopathy) or the effects of anti-coagulants. These determinations have been made visually from a chart record and they must represent accurately the variations of optical density with respect to time so that pertinent characteristics of the O.D. curve (and particularly straight lines therein) may be recognized and accurately interpreted.

The principal object of this invention is to provide an extremely simple, accurate and reliable apparatus for producing an electrical output which is linearly related to optical density.

In short, the invention comprises a source of light, most simply a laser because of its monochromatic character and high intensity, detection means for receiving the laser beam after it passes through a semi-transparent sample, and finally network means for effecting certain mathematical operations on the output of the detection means.

At the heart of the invention is the detection means. The detection means generates an electrical output which, throughout the intensity range from zero to the full intensity of the light source (or, otherwise stated, throughout substantially the entire range of transmittance of the light from the source) is approximately proportional to the sum of a constant and the logarithm of the transmittance of the sample. The detection means is preferably a generating photocell, and preferably a selenium or silicon generating photocell, as these inherently have the characteristic of providing an electrical output the amplitude of which is approximately proportional to the sum of a constant and the logarithm of the transmittance of the light from a light source through the sample.

Finally, the apparatus in accordance with the invention includes network means for effecting a subtraction of the output of the detection means from a first value and for multiplying the results by a second value. As will appear from the detailed description which follows, the network means converts the detection means output to a form in which it is proportional to optical density so that it may be displayed on a voltmeter or recorded on a chart recorder. The value from which the output of the detection means is subtracted is desirably variable, as is the value by which the result of the subtraction is multiplied. By adjustment of these values, the operator can calibrate the apparatus against samples of known optical density and thereafter run any number of samples of similar material having unknown optical density.

Preferably, the network comprises a variable voltage D.C. source comprising a constant voltage D.C. source (battery) and a first variable resistor (popularly known as a "potentiometer") connected across the constant voltage source, the variable voltage being derivable from a pair of terminals connected to the first variable resistor including a terminal connected to a movable tap on the resistor. The network also preferably includes a second variable resistor having a movable tap, and is preferably arranged so that the detection means, the variable voltage D.C. source and the second variable resistor are connected together in series in closed loop with the polarities of the detection means and the variable voltage D.C. source in opposition to each other to effect the aforementioned subtraction.

DETAILED DESCRIPTION

Figure 1:
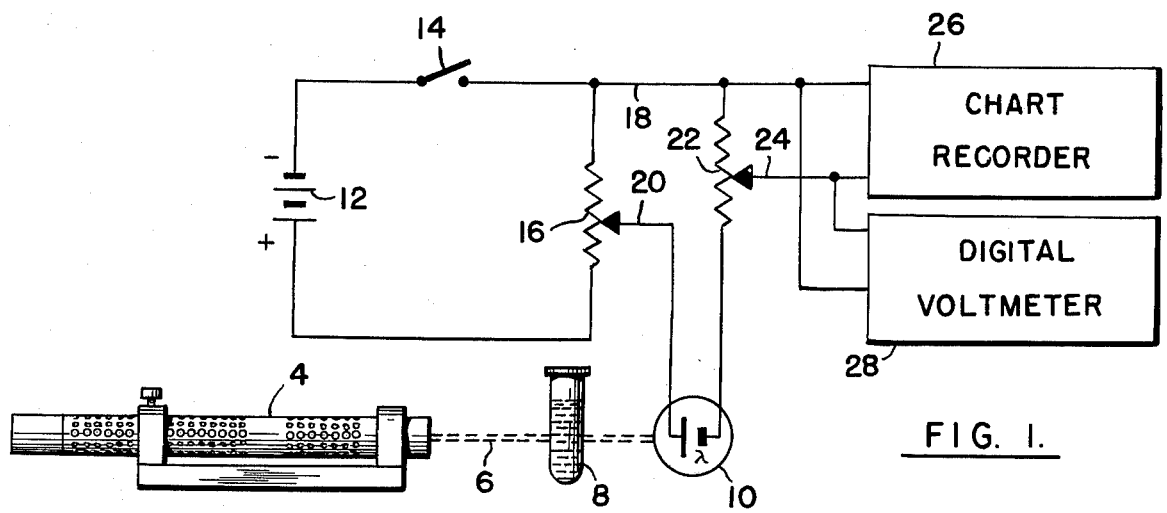
FIG. 1 is a diagram of the optical density measuring apparatus in accordance with the invention.

The invention, as shown in FIG. 1 comprises a light source 4, shown as a low-power gas laser producing a beam of light 6 which passes through a sample cuvette 8 and is received by detection means 10, which is preferably a silicon or selenium generating photocell (photovoltaic cell).

Battery 12 acts as a constant voltage D.C. source. Its negative terminal is connected through switch 14 to one end of variable resistor 16, and its positive terminal is connected directly to the opposite end of variable resistor 16. The combination of battery 12 and variable resistor 16 provides a variable voltage D.C. source, the variable voltage being derivable between line 18 at the upper terminal of resistor 16 and wiper 20. This variable voltage D.C. source is connected in series with detection means 10, the positive output of detection means 10 being connected to the wiper 20 of variable resistor 16 so that the voltage produced by the variable voltage D.C. source opposes the voltage produced by the detection means. The negative output of detection means 10 is connected through variable resistor 22 to line 18. Thus, the voltage across variable resistor 22 is the difference between the voltage produced by the variable voltage D.C. source and the voltage produced by the photovoltaic cell. The output of the electrical network is taken between line 18 and wiper 24 of variable resistor 22. Thus, variable resistor 22 acts as a multiplier, multiplying the voltage produced as a result of the aforesaid subtraction by a selectable variable depending on the setting of variable resistor 22. The output between line 18 and wiper 24 is delivered to a chart recorder 26, preferably of the kind having a linear time base, and also to a digital voltmeter 28. The chart recorder and digital voltmeter desirably have high impedance inputs so that the voltage produced by the variable voltage D.C. source is substantially unaffected by the setting of variable resistor 22.

The voltage output of detection means 10 is very nearly logarithmic in shape, but starts at zero when the detection means is dark and ranges up to a value E at full illumination. Thus, the voltage $e_d$ of the detection means can be represented to a close approximation by the following equation:

$$e_d = \log T + E \quad (1)$$

where T is the transmittance of the sample which is proportional to the intensity of the light transmitted by the sample.

The operation of the network means will be readily understood from the simple application of Kirchoff's voltage law:

$$n(m E_B - e_d) = e_o \quad (2)$$

where $n$ is a multiplier determined by the setting of resistor 22;

$m$ is a multiplier determined by the setting of resistor 16;

$E_B$ is the battery voltage; and $e_o$ is the voltage at the input of the chart recorder 26.

Substituting equation (1) into (2):

$$e_o = n(mE_B - E - \log T) \quad (3)$$

Equation (3) will be recognized as in the form of Beer's law which relates solute concentration to light transmittance. Thus, by an appropriate choice of values of $n$ and $m$, the voltage $e_o$ at the chart recorder input can be made to represent the concentration of solute in a sample.

In making measurements of solute concentration, the apparatus is first calibrated by the adjustment of resistors 16 and 22 with the aid of two samples of known concentration, one of relatively low concentration, and the other of relatively high concentration. Preferably the sample of high concentration is placed in the path of light beam 6, and resistor 16 is adjusted until the digital voltmeter reading agrees with the known concentration. Then, the sample of high concentration is replaced by the sample of low concentration and resistor 22 is adjusted until the digital voltmeter displays a reading agreeing with the known value of concentration for the sample of low concentration. The sample of high concentration is reinserted, and the process is repeated one or more times until little or no readjustment of the variable resistors is required. The apparatus is then ready to measure the concentrations in any number of successive samples of like material of unknown concentration, and will provide a direct reading on the digital voltmeter e.g. in mg. percent or in any other desired scale of measurement.

Figure 2:
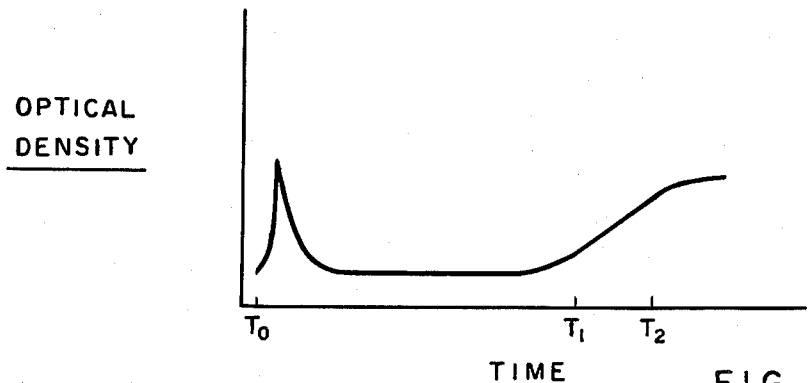
FIG. 2 is a plot of optical density against time in a typical blood clotting measurement, for the purpose of illustrating a particular application of the invention as shown in FIG. 1.

The apparatus shown in FIG. 1 is also useful in clinical or other chemical analysis, particularly where O.D. versus time curves are to be interpreted. For example, FIG. 2 is a curve of O.D. plotted against a linear time base showing the effect of thromboplastin reagent on citrated plasma. This test is used to determine diseases of blood coagulation and the effect of anti-coagulant on a patient. The curve can be analyzed to obtain information concerning plasma fibrinogen content, thrombin activity and fibrin stabilization. If the thromboplastin reagent is introduced at time $T_o$, the disturbance of the mixing in the light path causes the O.D. to increase momentarily. It then returns to a low value, remaining there until $T_1$ when fibrin begins to form. The formation of fibrin takes place between $T_1$ and $T_2$. The amount of fibrinogen converted in the formation of the clot is determined by the change in O.D. between $T_1$ and $T_2$. The prothrombin time is $T_2 - T_o$. The rate of change of O.D. between $T_1$ and $T_2$ is a reflection of thrombin activity. The curve is very nearly straight between $T_1$ and $T_2$, and it is the straightness of the curve which permits the recognition of times $T_1$ and $T_2$. Thus, it is important that the plot be linear with respect to optical density as well as with respect to time. The plot, which can be produced on chart recorder 26, can be analyzed visually, the straight line portion being readily recognizable, and times $T_1$ and $T_2$ being thus determined. Alternatively the output of the network means at wiper 24 and line 18 may be digitized and fed into a computer, off or on line, for automatic recognition of times $T_1$ and $T_2$ by virtue of the straight line portion of the curve therebetween. The computer can calculate and display prothrombin time, thrombin activity, and clotable fibrinogen.

A typical example of the method whereby prothrombin time is used to determine the dosage of an anti-coagulant needed for a patient is as follows.

If a physician wishes to double the prothrombin time, $T_2 - T_o$, of a patient, a prepared plasma specimen of the patient's blood is run through the apparatus to determine the normal prothrombin time which is ascertained to be twelve seconds. Then a known dose of anti-coagulant Warfarin or Dicumarol family) is administered to the patient and, after suitable time a second prepared plasma specimen of the patient's blood is obtained and the second specimen is run through the apparatus and the prothrombin time is determined, for example to be twenty seconds. Increased dose of anti-coagulant would then be administered, prothrombin time repeated and dosage adjusted until the patient's prothrombin time is between 24 and 30 seconds (2 to 2½ times the normal), the desired prothrombin time for therapeutic anticoagulation of the patient.

The same apparatus can also be used to determine partial thromboplastin times by substituting partial thromboplastin reagent for the thromboplastin reagent, thrombin times by substituting thrombin reagent for the thromboplastin reagent, or other procedures whereby clotting end points are sought.

The invention described above may be readily applied to other clinical analyses, such as enzyme analysis, platlet aggregation electrophoresis, etc., and may be used wherever a substantially linear electrical representation of optical density is desired.

The inventive apparatus is readily made portable, and adapted for use in power black-out emergencies. In such portable apparatus, the light source 4 may be battery operated, and a simple galvinometer is substituted for chart recorder 26 and digital voltmeter 28 to provide the read-out.

Numerous modifications can be made to the apparatus specifically disclosed, although some modifications may result in a less satisfactory instrument by reason of additional complexity. A tungsten lamp or other light sources, with or without wavelength selecting devices, can be substituted for the laser as light source, but this reduces both range and specificity of the apparatus. Essentially, the more pure the wavelength absorbance of the measured solution, the greater the light bandwidth may be and the less intense the light source may be, and vice-versa. In the current state of the art, therefore, the laser provides maximum range and specificity. One example of a possible modification is the use of a difference amplifier to effect the electrical subtraction performed in FIG. 1 by the simple resistive network. Another example would be the use of a detecting means consisting of a photosensitive resistor or phototransistor together with a source of current and circuitry for effecting the production of a logarithmic output resembling the output of the silicon or selenium generating photocell. A still further modification would involve the automatic adjustment of resistances in the network means by an electrical or electromechanical servomechanism. Still further modifications may occur to those skilled in the art and may be made without departing from the invention as defined in the following claims.

We claim:

1. A method for determining the coagulation characteristics of analytical body fluid samples by measuring the optical density of the samples comprising: directing a light beam from a light source through the analytical fluid sample, receiving the light from said source after it passes through the sample and generating an electrical output the amplitude of which throughout substantially the entire range of transmittance of the light from the source is approximately proportional to the sum of a constant and the logarithm of the transmittance; and subtracting said output from a first value and multiplying the result by a second value to obtain a final result.

2. A method of varying the prothrombin time of a patient's blood comprising the steps of subjecting a first prepared plasma specimen of the patient's blood to the steps of adding thrromboplastin reagent to said specimen; directing a light beam from a light source through said first specimen; receiving the light from said source after it passes through the sample and generating an electrical output the amplitude of which throughout substantially the entire range of transmittance of the light from the source is approximately proportional to the sum of a constant and the logarithm of the transmittance; subtracting said output from a first value and multiplying the result by a second value to obtain a prothrombin time for the first specimen; administering an anti-coagulant in a specific amount to the patient; after administration of said anti-coagulant, obtaining a second specimen of the patient's blood; preparing plasma; adding thromboplastin reagent; directing said light beam through said second specimen; receiving the light from said source after it passes through said second specimen and generating an electrical output the amplitude of which throughout substantially the entire range of transmittance of the light from the source is approximately proportional to the sum of a constant and the logarithm of the transmittance; subtracting said output from said second specimen from a first value and multiplying the result by a second value to obtain a prothrombin time for the second specimen; whereby the anti-coagulant dosage necessaRy to achieve a desired prothrombin time in the patient can be determined from the prothrombin times measured in the first and second specimens.

3. Apparatus for measuring the optical density of a sample as in measuring prothrombin time and the like comprising: a source of light; detection means arranged to receive light from said source after it passes through the sample and generating an electrical output the amplitude of which throughout substantially the entire range of transmittance of the light from the source is approximately proportional to the sum of a constant and the logarithm of the transmittance; and network means for subtracting the output generated by the detection means from a first value and for multiplying the result by a second value to obtain a final result.

4. Apparatus according to claim 3 in which the source of light is a laser.

5. Apparatus according to claim 3 in which the detection means is a generating photocell.

6. Apparatus according to claim 3 in which the detection means is a selenium or silicon generating photocell.

7. Apparatus according to claim 3 in which the network means comprises means for selectably varying said first value and means for selectably varying said second value.

8. Apparatus according to claim 3 in which the network means comprises a variable voltage D.C. source comprising a constant voltage D.C. source and a first variable resistor connected across said constant voltage source, the variable voltage being derivable from a pair of terminals connected to said first variable resistor including a terminal connected to a movable tap on said resistor, a second variable resistor having a movable tap, and wherein the detection means, the variable voltage D.C. source, and the second variable resistor are connected together in series in a closed loop with the polarities of the detection means and the variable voltage D.C. source in opposition to each other.

* * * * *